US011579325B2

(12) United States Patent
Al-Shehri et al.

(10) Patent No.: US 11,579,325 B2
(45) Date of Patent: Feb. 14, 2023

(54) METHOD AND SYSTEM FOR MAPPING UNDERGROUND SENSORS ONTO A NETWORK MAP

(71) Applicant: SAUDI ARABIAN OIL COMPANY, Dhahran (SA)

(72) Inventors: Abdallah Al-Shehri, Dhahran (SA); Abdulelah Shewoil, Jeddah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 277 days.

(21) Appl. No.: 16/867,053

(22) Filed: May 5, 2020

(65) Prior Publication Data
US 2021/0349230 A1 Nov. 11, 2021

(51) Int. Cl.
| G01V 3/30 | (2006.01) |
| E21B 47/0228 | (2012.01) |
| G01V 3/08 | (2006.01) |
| G01V 3/12 | (2006.01) |
| G01V 3/34 | (2006.01) |

(52) U.S. Cl.
CPC ............ *G01V 3/30* (2013.01); *E21B 47/0228* (2020.05); *G01V 3/081* (2013.01); *G01V 3/083* (2013.01); *G01V 3/088* (2013.01); *G01V 3/12* (2013.01); *G01V 3/34* (2013.01)

(58) Field of Classification Search
CPC .......... G01V 3/30; G01V 3/081; G01V 3/083; G01V 3/088; G01V 3/12; G01V 3/34; H04Q 9/00; H04Q 2209/00; H04Q 2209/10; H04Q 2209/20; H04Q 2209/25;
(Continued)

(56) References Cited

U.S. PATENT DOCUMENTS 10,042,077 B2 * 8/2018 Schmidt .................... G01V 3/28
10,999,653 B2 * 5/2021 Dahm .................. H04L 63/1491
(Continued)

FOREIGN PATENT DOCUMENTS

| CN | 107607109 A | 1/2018 |
| CN | 108240810 A | 7/2018 |

OTHER PUBLICATIONS

T. Ahmad et al. "3D Localization based on Parametric Loop Division and Subdivision Surfaces for Wireless Sensor Networks" IEEE, 2016 (6 pages).
(Continued)

*Primary Examiner* — Franklin D Balseca

(57) ABSTRACT

A method for mapping underground sensors onto a network map may include obtaining a plurality of magnetic measurements from a plurality of sensors. The method may include using the plurality of magnetic measurements for determining a plurality of sensor locations in an initial network map. The method may include generating updated network maps from the perspective of each localized sensor. The method may include merging the updated network maps into a final network map, the final network map comprising a most accurate location for each sensor. The method may include determining inner localized sensors out of the plurality of sensors in the final network map. The method may include identifying the inner localized sensors as new base station anchors. The method may include mapping the inner localized sensors onto the final network map as new base station anchors.

20 Claims, 12 Drawing Sheets

(58) Field of Classification Search
CPC . H04Q 2209/40; E21B 47/0228; E21B 47/12; E21B 47/13
See application file for complete search history.

(56) References Cited

U.S. PATENT DOCUMENTS

| | | |
|---|---|---|
| 11,119,243 B2 * | 9/2021 | De Barros Braga .... G01V 3/12 |
| 2011/0218759 A1 | 9/2011 | Jin |
| 2013/0226512 A1 | 8/2013 | McIntyre et al. |
| 2017/0299759 A1 | 10/2017 | Schmidt et al. |
| 2019/0250219 A1 | 8/2019 | Shin et al. |
| 2019/0383619 A1 | 12/2019 | Roper et al. |

OTHER PUBLICATIONS

R. Takahashi et al. "Three-Dimensional Localization Method: Mi-Nashi in Multi-Robot Systems" 11th Asian Control Conference (ASCC), Dec. 17-20, 2017 (6 pages).
International Search Report and Written Opinion in corresponding Internatinoal Application No. PCT/US2020/035193, dated Sep. 29, 2020 (13 pages).
Shih-Chun Lin et al: "Magnetic Induction-Based Localization in Randomly-Deployed Wireless Underground Sensor Networks", IEEE Internet of Things Journal, Jan. 1, 2017 (Jan. 1, 2017), pp. 1-1, DOI: 10.1109/jiot.2017.2729887 (11 pages).

* cited by examiner

METHOD AND SYSTEM FOR MAPPING UNDERGROUND SENSORS ONTO A NETWORK MAP

BACKGROUND

Wireless Underground Sensor Networks (WUSNs) are networks that interconnect sensor nodes wirelessly. These nodes can be deployed in a variety of underground environments, such as shallow soil, underground tunnels, and hydrocarbon reservoirs. Applications involving WUSNs require knowing location information for any randomly deployed sensor nodes. However, challenging underground environments prevent any direct application of the conventional localization solutions based on the propagation properties of electromagnetic (EM) waves or Global Positioning System (GPS) triangulations because of their extremely short communication ranges and highly unreliable channel conditions.

SUMMARY

In general, in one aspect, embodiments disclosed herein relate to a method for mapping underground sensors onto a network map. The method includes obtaining a plurality of magnetic measurements from a plurality of sensors. The method includes using the plurality of magnetic measurements for determining a plurality of sensor locations in an initial network map. The method includes generating updated network maps from the perspective of each localized sensor. The method includes merging the updated network maps into a final network map, the final network map comprising a most accurate location for each sensor. The method includes determining inner localized sensors out of the plurality of sensors in the final network map. The method includes identifying the inner localized sensors as new base station anchors. The method includes mapping the inner localized sensors onto the final network map as new base station anchors.

In general, in one aspect, embodiments disclosed herein relate to a system for mapping underground sensors onto a network map. The system includes a well control system coupled to a plurality of sensors, and a reservoir simulator comprising a computer processor. The reservoir simulator includes functionality for obtaining a plurality of magnetic measurements from a plurality of sensors. The reservoir simulator includes functionality for using the plurality of magnetic measurements for determining a plurality of sensor locations in an initial network map. The reservoir simulator includes functionality for generating updated network maps from the perspective of each localized sensor. The reservoir simulator includes functionality for merging the updated network maps into a final network map, the final network map comprising a most accurate location for each sensor. The reservoir simulator includes functionality for determining inner localized sensors out of the plurality of sensors in the final network map. The reservoir simulator includes functionality for identifying the inner localized sensors as new base station anchors. The reservoir simulator includes functionality for mapping the inner localized sensors onto the final network map as new base station anchors.

In general, in one aspect, embodiments disclosed herein relate to a non-transitory computer readable medium storing instructions executable by a computer processor for mapping underground sensors onto a network map. The instructions comprising functionality for obtaining a plurality of magnetic measurements from a plurality of sensors. The instructions comprising functionality for using the plurality of magnetic measurements for determining a plurality of sensor locations in an initial network map. The instructions comprising functionality for generating updated network maps from the perspective of each localized sensor. The instructions comprising functionality for merging the updated network maps into a final network map, the final network map comprising a most accurate location for each sensor. The instructions comprising functionality for determining inner localized sensors out of the plurality of sensors in the final network map. The instructions comprising functionality for identifying the inner localized sensors as new base station anchors. The instructions comprising functionality for mapping the inner localized sensors onto the final network map as new base station anchors.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
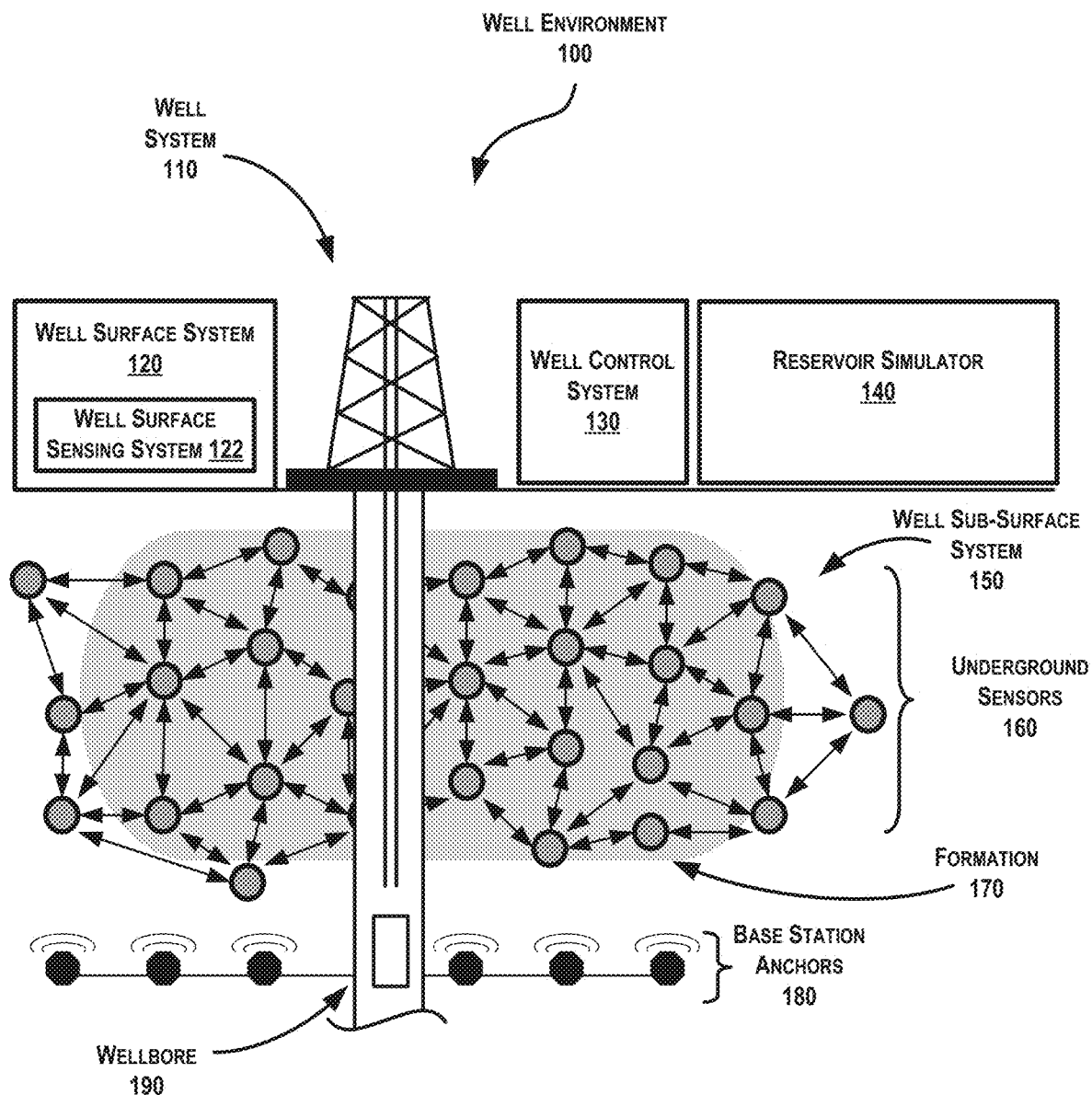
FIG. 1 shows a schematic diagram of a system in accordance with one or more embodiments.

This application discloses improvements to U.S. Pat. No. 10,151,851 entitled "MAGNETIC INDUCTION BASED LOCALIZATION FOR WIRELESS SENSOR NETWORKS IN UNDERGROUND OIL RESERVOIRS" and filed on Jun. 20, 2018, which is incorporated by reference in its entirety.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using location determining algorithms and merging algorithms to map various underground sensors in fractured hydrocarbon reservoirs. For example, underground sensors of a well system may be tracked by a reservoir simulator to identify their approximate locations in real time. Specifically, underground sensors injected into a fracture may spread in various branching paths throughout a hydraulic fracture ("fracture") into a hydrocarbon reservoir ("reservoir"). The underground sensors may be miniature sensors (e.g., FracBots) configured to transmit and receive signals using Magnetic Induction (MI). Accordingly, in some embodiments, a reservoir simulator may maintain a constant feed of Received Magnetic Field Strengths (RMFS) measurements from the MI-based communication exchanges between the underground sensors. Using the RMFS measurements and various reference locations (i.e., known locations in the reservoir), an exact location of the underground sensors may be approximated at all times of the injection process and after the underground sensors have stopped moving in the fracture. As a result, a network map may be created including the exact location of each underground sensor injected in the fracture.

Using the RMFS measurement values and the various reference locations, a distance approximation algorithm and a three-dimensional (e.g., 3D) triangulation algorithm may assist in determining an approximate location of the underground sensors. For example, the reservoir simulator may evaluate the RMFS measurement values to estimate distances between underground sensors and the reference locations and between underground sensor pairs. The various reference locations may be known base station anchor locations from a wellbore such that an initial network map may be generated including the exact location of each base station anchor. Underground sensor pairs may be neighboring underground sensors capable of communication exchanges with one another, these exchanges may be limited only by the computational capacities of the system. As such, to determine the approximate location of the underground sensors in the reservoir, the reservoir simulator may seek to estimate distances from the base station anchors to underground sensors with the highest RMFS values. Once these distances are estimated, the reservoir simulator may verify the estimated distances by calculating locations in the reservoir for each underground sensor with respect to the base station anchors.

Using the approximate locations of each underground sensor and the location of the closest reference locations to each sensor, a multi-maps merging algorithm and an inner anchors algorithm may assist in identifying the exact location of each underground sensor for generating a final network map of the reservoir. For example, the reservoir simulator may generate an updated version of the initial network map for each underground sensor distance that has been verified. Once all of the underground sensors have a corresponding updated network map, the reservoir simulator may combine all of the updated network maps to generate a final network map. While generating the updated network maps, certain underground sensor locations may be verified more than once. As a result, in subsequent upgraded network maps, these underground sensor locations may be used as new reference locations such that computational power may be reduced the more underground sensor locations are verified.

In one or more embodiments, the aforementioned systems and methods provide a reservoir simulation with input for generating a final network map of a reservoir including identified exact current locations of various underground sensors. The underground sensors are not required to assume initial positions in the reservoir nor are the underground sensors required to be on a standstill before their exact location is mapped. In particular, embodiments estimate and verify the exact location for each underground sensor such that a point of interest (e.g., an unknown underground sensor location) is not required to be in the middle of various reference locations nor is the exact location limited to a two-dimensional (e.g., 2D) plane.

Turning to FIG. 1, FIG. 1 shows a schematic diagram in accordance with one or more embodiments. As shown in FIG. 1, FIG. 1 illustrates a well environment (100) that includes a reservoir located in a subsurface formation ("formation") (170) and a well system (110). The formation (170) may include a porous or fractured rock formation that resides underground, beneath Earth's surface ("surface"). In the case of the well system (110) being a hydrocarbon well, the reservoir may include a portion of the formation (170) that includes a subsurface pool of hydrocarbons, such as oil and gas. The formation (170) and the reservoir may include different layers of rock having varying characteristics, such as varying degrees of permeability, porosity, and resistivity. In the case of the well system (110) being operated as a production well, the well system (110) may facilitate the extraction of hydrocarbons (or "production") from the reservoir.

In some embodiments, the well system (110) includes a wellbore (190), a well sub-surface system (150), a well surface system (120), and a well control system ("control system") (130). The control system (140) may control various operations of the well system (110), such as well production operations, well completion operations, well maintenance operations, and reservoir monitoring, assessment and development operations. In some embodiments, the control system (110) includes a computer system that is the same as or similar to that of computer system (1200) described below in FIGS. 12A and 12B and the accompanying description.

The wellbore (190) may include a bored hole that extends from the surface into a target zone of the formation (170), such as the reservoir. An upper end of the wellbore (190), terminating at or near the surface, may be referred to as the "up-hole" end of the wellbore (190), and a lower end of the wellbore, terminating in the formation (170), may be referred to as the "down-hole" end of the wellbore (190). The wellbore (190) may facilitate the circulation of drilling fluids during drilling operations, the flow of hydrocarbon production ("production") (e.g., oil and gas) from the reservoir to the surface during production operations, the injection of substances (e.g., water) into the formation (170) or the during injection operations, or the communication of monitoring devices (e.g., logging tools) into the formation (170) or the reservoir during monitoring operations (e.g., during in situ logging operations).

In some embodiments, during operation of the well system (110), the control system (130) collects and records wellhead data for the well system ("well") (110). The wellhead data may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well system (110), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data may be referred to as "real-time" wellhead data. Real-time wellhead data may enable an operator of the well system (110) to assess a relatively current state of the well system (110), and make real-time decisions regarding development of the well system (110) and the reservoir, such as on-demand adjustments in regulation of production flow from the well.

In some embodiments, the well sub-surface system (150) includes casing installed in the wellbore (190). For example, the wellbore (190) may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In some embodiments, the casing includes an annular casing that lines the wall of the wellbore (190) to define a central passage that provides a conduit for the transport of tools and substances through the wellbore (190). For example, the central passage may provide a conduit for lowering logging tools into the wellbore (190), a conduit for the flow of production (e.g., oil and gas) from the reservoir to the surface, or a conduit for the flow of injection substances (e.g., water) from the surface into the formation (170). In some embodiments, the well sub-surface system (150) includes production tubing installed in the wellbore (190). The production tubing may provide a conduit for the transport of tools and substances through the wellbore (190). The production tubing may, for example, be disposed inside casing. In such an embodiment, the production tubing may provide a conduit for some or all of the production (e.g., oil and gas) passing through the wellbore (190) and the casing.

Keeping with FIG. 1, in some embodiments, the well sub-surface system (150) includes underground sensors (160) injected into the fracture through the wellbore (190). The underground sensors (160) may be hardware and software configured for exchanging wireless communications within the formation (170). The underground sensors (160) may be distributed into the fracture through the injection process. Accordingly, the underground sensors (160) may be located anywhere in the formation (170) at any given time. The underground sensors (160) may exchange wireless communications (represented by double sided arrows) with each other and with other wireless devices within a range of transmission. For example, a receiver located at the wellbore (190) may be configured to receive transmissions from the underground sensors (160).

In some embodiments, the well sub-surface system (150) includes base station anchors (180) placed into the formation (170) through the wellbore (190). The base station anchors (180) may be hardware and software configured for exchanging wireless communications within the formation (170). The base station anchors (180) may be distributed into the formation (170) through before the injection process. As such, the base station anchors (180) do not enter the formation (170) during production, but remain in the wellbore (190) after drilling of the well (110). In this regard, the base station anchors (180) may be extracted from the wellbore (190) after completing a mapping of the formation (170). The base station anchors (180) may be deliberately located near a perceived bottom of the formation (170). The perceived bottom of the formation (170) may be determined during drilling or surveying before drilling of the well (110). Further, the perceived bottom of the formation (170) may be identified after drilling of the well (110). The base station anchors (180) may exchange wireless communications (represented by upward expanding ripples) with each other and with other wireless devices within a range of transmission. For example, a device located at the wellbore (190) and the underground sensors (160) may be configured to exchange information with the base station anchors (180).

In one or more embodiments, the base station anchors (180) may be large dipole antenna inside the wellbore (190). As such, a communication link exchanging information in real-time may be established with the underground sensors (160) inside the fracture. The information from the underground sensors (160) may be transmitted to the base station anchors (180) via a multi-hop technique over the communication link established among the underground sensors (160).

In some embodiments, the well surface system (120) includes a wellhead (not shown). The wellhead may include a rigid structure installed at the "up-hole" end of the wellbore (190), at or near where the wellbore (190) terminates at the Earth's surface. The wellhead may include structures for supporting (or "hanging") casing and production tubing extending into the wellbore (190). Production may flow through the wellhead, after exiting the wellbore (190) and the well sub-surface system (150), including, for example, the casing and the production tubing. In some embodiments, the well surface system (120) includes flow regulating devices that are operable to control the flow of substances into and out of the wellbore (190). For example, the well surface system (120) may include one or more production valves that are operable to control the flow of production. For example, a production valve may be fully opened to enable unrestricted flow of production from the wellbore (190).

Keeping with FIG. 1, in some embodiments, the well surface system (120) includes a surface sensing system (122). The surface sensing system (122) may include sensors for sensing characteristics of substances, including production, passing through or otherwise located in the well surface system (120). The characteristics may include, for example, pressure, temperature and flow rate of production flowing through the wellhead, or other conduits of the well surface system (120), after exiting the wellbore (120).

In some embodiments, the surface sensing system (122) includes a surface pressure sensor operable to sense the pressure of production flowing through the well surface system (120), after it exits the wellbore (190). The surface temperature sensor may include, for example, a wellhead temperature sensor that senses a temperature of production flowing through or otherwise located in the wellhead, referred to as "wellhead temperature" ($T_{wh}$). In some embodiments, the surface sensing system (122) includes a flow rate sensor operable to sense the flow rate of production flowing through the well surface system (120), after it exits the wellbore (190). The flow rate sensor may include hardware that senses a flow rate of production ($Q_{wh}$) passing through the wellhead.

In some embodiments, the well system (110) includes a reservoir simulator (140). For example, the reservoir simulator (140) may include hardware and/or software with functionality for generating one or more reservoir models regarding the formation (170) and/or performing one or more reservoir simulations. For example, the reservoir simulator (170) may store initial network maps, base station anchor locations, underground sensor locations, updated network maps, and data regarding RMFS measurements and location references. Further, the reservoir simulator (170) may store well logs and data regarding core samples for performing simulations. A reservoir simulator may further analyze the initial network maps, base station anchor locations, underground sensor locations, updated network maps, RMFS measurement data, location reference data, and/or other types of data to generate and/or update the one or more reservoir models. While the reservoir simulator (140) is shown at a well site, embodiments are contemplated where reservoir simulators are located away from well sites. In some embodiments, the reservoir simulator (140) may include a computer system that is similar to the computer system (1200) described below with regard to FIGS. 12A and 12B and the accompanying description.

In some embodiments, the reservoir simulator (140) may maintain a constant feed of RMFS measurements from the MI-based communication exchanges between the underground sensors (160). As the underground sensors (160) are randomly deployed in reservoir fractures, the locations of the underground sensors (160) may be initially considered to be unknown. Further, as the base station anchors (180) are deliberately placed, the locations of the base station anchors (180) may be considered as a reference point for an entire localization framework. For example, the base station anchors (180) may expand and ground the communication link formed by the underground sensors (160). As such, the entire localization framework may increase by tracking induction between a transmitter coil antenna and a receiver coil antenna of any two underground sensors (160), an underground sensor and a base station anchor, or any two base station anchors.

In one or more embodiments, the reservoir simulator (140) may use the RMFS measurements and the various reference locations (i.e., known locations in the reservoir) to approximate an exact location of the underground sensors (160) at all times of the injection process and after the underground sensors (160) have stopped moving in the fracture. As a result, a network map may be created including the exact location of each underground sensor injected in the fracture.

In one or more embodiments, the reservoir simulator (140) may use the RMFS measurement values and the various reference locations in a distance approximation algorithm (or "scheme") and a 3D triangulation algorithm to determine an approximate location of the underground sensors (160) in the reservoir. For example, the reservoir simulator (140) may evaluate the RMFS measurement values to estimate distances between underground sensors (160) and the reference locations and between underground sensor pairs. The various reference locations may be known base station anchor locations from the wellbore (190) such that an initial network map may be generated including the exact location of each base station anchor. Underground sensor pairs may be neighboring underground sensors (160) capable of communication exchanges with one another through the communication link, these exchanges may be limited only by the computational capacities of the system. As such, to determine the approximate location of the underground sensors (160) in the reservoir, the reservoir simulator (140) may seek to estimate distances from the base station anchors (180) to the underground sensors (160) with the highest RMFS values. Once these distances are estimated, the reservoir simulator (140) may verify the estimated distances by calculating locations in the reservoir for each underground sensor with respect to the base station anchors (180).

In one or more embodiments, the reservoir simulator (140) may use the approximate locations of each underground sensor and the location of the closest reference locations to each underground sensor in a multi-maps merging algorithm and an inner anchors algorithm to identify the exact location of each underground sensor and for generating a final network map of the reservoir. For example, the reservoir simulator (140) may generate an updated version of the initial network map for each underground sensor distance that has been verified. Once all of the underground sensors (160) have a corresponding updated network map, the reservoir simulator (140) may combine all of the updated network maps to generate a final network map. While generating the updated network maps, certain underground sensor locations may be verified more than once. As a result, in subsequent upgraded network maps, these underground sensor locations may be used as new reference locations such that computational power may be reduced progressively the more underground sensor locations are verified.

While FIG. 1 shows various configurations of components, other configurations may be used without departing from the scope of the disclosure. For example, various components in FIG. 1 may be combined to create a single component. As another example, the functionality performed by a single component may be performed by two or more components.

Turning to FIGS. 2-5, FIGS. 2-5 describe individual methods that may be used in combination to obtain a final network map. One or more blocks in FIGS. 2-5 may be performed by one or more components as described above in FIG. 1 (e.g., reservoir simulator (140)). While the various blocks in FIGS. 2-5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Figure 2:
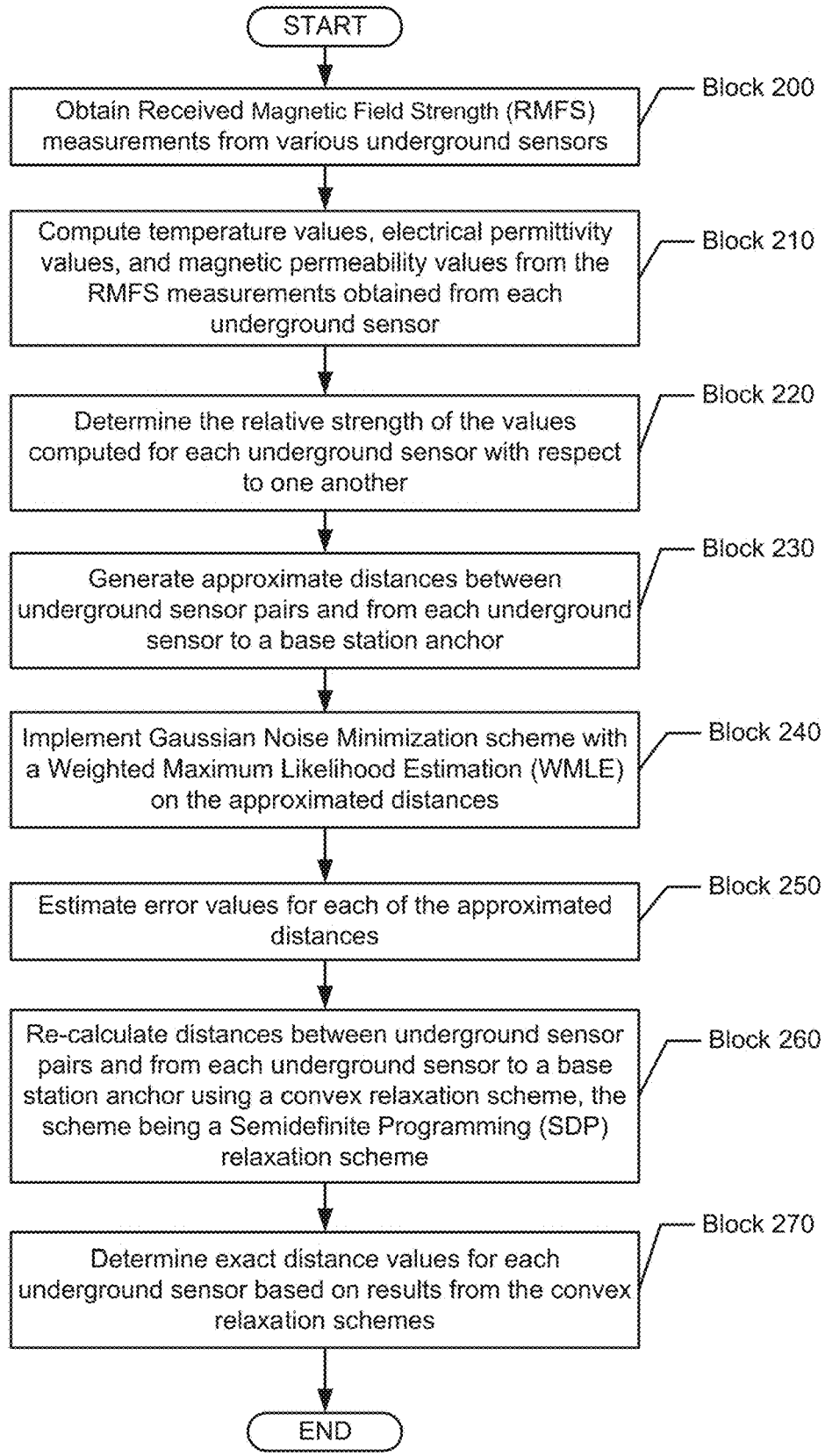
FIG. 2 shows a flowchart in accordance with one or more embodiments.

Turning to FIG. 2, FIG. 2 shows a flowchart in accordance with one or more embodiments. Specifically, FIG. 2 describes a method for approximating distances between underground sensor pairs and underground sensors and base station anchors. For example, a reservoir simulator may execute a distance approximation algorithm by estimating distances based on collected RFMS measurement values and by correcting errors on the distances estimated.

In Block 200, the reservoir simulator obtains RMFS measurements from various underground sensors in accordance to one or more embodiments. The underground sensors may be moving or static and the RMFS measurements may be obtained by one or more receptors such that measurements are identified in sequence or simultaneously (i.e., in serial or parallel communication transmission schemes).

In Block 210, the reservoir simulator computes temperature values, electrical permittivity values, and magnetic values from the RMFS measurements from each underground sensor in accordance to one or more embodiments.

The reservoir simulator may decode the RMFS measurements for each underground sensor to extract information and compute various physical parameters. Specifically, the reservoir simulator may identify and determine a temperature T, an electrical permittivity $\varepsilon$, and a magnetic permeability $\mu$ of a medium in which the underground sensors are located.

In Block 220, the reservoir simulator determines a relative strength of the values computed from each underground sensor with respect to one another in accordance to one or more embodiments. A difference between calculated values is determined between neighboring underground sensors to identify the underground sensors located closest to the base station anchors. For example, a distance between transmitter and receiver coils can be uniquely obtained from the RMFS measurements upon reception, these measurements may be different for each underground sensor pair. As such, each set of calculated values will be different for each RMFS measurement and those pairs with a highest RMFS measurement may be identified.

In Block 230, the reservoir simulator generates approximate distances between underground sensor pairs and from each underground sensor to a base station anchor in accordance to one or more embodiments. Based on the parameters decoded, a distance may be estimated for each measurement performed by each underground sensor. In some embodiments, estimated distances between any pair-wise underground sensors ("$\hat{d}ij$") and between any underground sensors and any base station anchors ("$\hat{d}ik$") may be estimated. As such, approximate distances may be generated between neighboring underground sensor pairs ("$\hat{d}ij$") and between underground sensors and base station anchors ("$\hat{d}ik$") regardless of whether these devices are the closest devices to one another.

In Block 240, the reservoir simulator implements a Gaussian Noise Minimization scheme with a Weighted Maximum Likelihood Estimation (WMLE) on the approximated distances in accordance to one or more embodiments. Specifically, most estimation errors originated from the background noises in the reservoir may be corrected by modeling them as Gaussian random variables (i.e., wij, wik: $N(0, \sigma ij2)$ and the estimated distances as $\hat{d}ij=dij+wij$, $\hat{d}ik=d(xi, ak)+wik$). To this point, the WMLE may be projected to minimize any mismatch between pairwise underground sensors and their estimated distances from the creation of a likelihood function.

In Block 250, the reservoir simulator estimates error values for each of the approximated distances are estimated in accordance to one or more embodiments. Thus, any errors from the estimated distances may be further included in the WMLE.

In Block 260, the reservoir simulator re-calculates distances between underground sensor pairs and from each underground sensor to a base station anchor using a convex relaxation scheme in accordance to one or more embodiments. Specifically, errors may be corrected implementing a Semi-Definite Programming (SDP) relaxation to reformulate the WMLE from Block 240 into a convex relaxation.

In Block 270, the reservoir simulator determines exact distance values for each underground sensor based on results from the convex relaxation schemes in accordance to one or more embodiments. In particular, by transforming and relaxing the variables can be solved mathematically. Several vital parameters may be provided, such as $A_{ij}$ and $\overline{A}_{ik}$, which represent connections among underground sensors and base station anchor. As such, the estimated distances without errors may now be used in structuring an accurate localization of the sensors. This localization structure may provide the basis for handling the unique multi-path and fading free propagation properties of MI-based signals for an accurate localization schemes.

Figure 3:
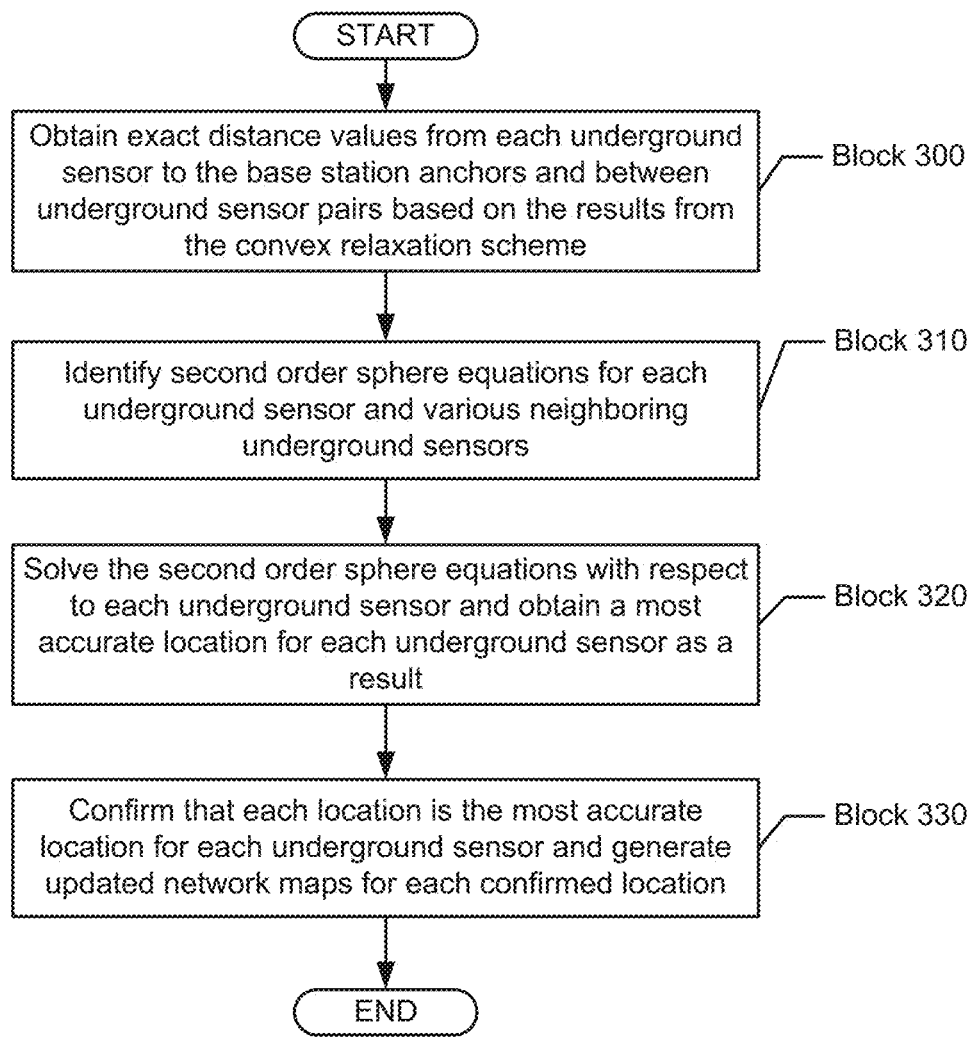
FIG. 3 shows a flowchart in accordance with one or more embodiments.

Turning to FIG. 3, FIG. 3 shows a flowchart in accordance with one or more embodiments. Specifically, FIG. 3 describes a method for approximating a position of each underground sensor in the initial network map. For example, the reservoir simulator may execute a 3D triangulation algorithm by identifying and solving spherical second order equations from the perspective of a point of interest. The point of interest may be an estimated location of an underground sensor. The determiner In Block 300, the reservoir simulator obtains an exact distance value for each underground sensor from the base station anchor and between underground sensor pairs based on results from the convex relaxation scheme described in FIG. 2 according to one or more embodiments. Specifically, the reservoir simulator finds all the distances between each sensor and every base station anchor position. To this point, at least three reference points may be used for obtaining three second order equations. Thus, further approximating the distances becomes a second order mathematical problem with four spheres equations and three unknowns (i.e., one equation for each second order equation).

In Block 310, the second order sphere equations are identified for each underground sensor and various neighborhood underground sensors according to one or more embodiments. Specifically, since base station anchor readings may be taken from a region below the underground sensors in the upper half of the fracture and from above the underground sensors in the lower half of the fracture (as shown in FIG. 1), four spheres equations may be used tracking four different base station anchor reading positions only in the first generated map.

In some embodiments, any network model including the estimated locations may be represented mathematically. Specifically, channel models for MI-based communications may be used when approximated distances and estimated locations are available. To this point, assuming that a WUSN comprises a number N of underground sensors with random positions denoted by a set $\{(xi, yi, zi) \in \mathbb{R} n: 1 \leq i \leq N\}$ and base station anchors with a number of known positions "B" denoted by the set $\{ab \in \mathbb{R} n: 1 \leq b \leq B\}$, the estimated distances among underground sensors may be obtained by following $\hat{d}ij$, $1 \leq i \leq N$ and $j \in NHi$ (where NHi denotes the neighbor set of underground sensor i) and the estimated distances between every base station anchor position and all underground sensors may be obtained by following $\hat{d}ik$, $1 \leq i \leq N$ and $1 \leq b \leq B$.

In Block 320, the second order sphere equations are solved with respect to each underground sensor and obtain a most accurate location for each underground sensor as a result according to one or more embodiments. Specifically, the exact location of an underground sensor in a range of three base station anchors may be triangulated since three spheres centered at a corresponding base station anchor intersect at the location of the underground sensor.

In one or more embodiments, the reservoir simulator may identify unknown underground sensor locations based on the given base station anchor locations and the estimated distances across the formation. As such, the localization framework may be formed as a four second order equations for any given underground sensor within range (i.e., to be explained in more detail with respect to FIGS. 2-5), with three unknowns (x, y, and z coordinates). Specifically, using the distances approximated from RMFS measurements, the error correction scheme, and the 3D triangulation method, updated network maps may be generated with the approximate coordinates of each underground sensor. In other words, after obtaining a rough estimate of where each underground sensor may be located, the localization framework may be reduced to recognize three second order equations (e.g., three spheres equations) per underground sensor.

In Block 330, the reservoir simulator confirms that each location solved for in Block 320 is the most accurate location for each underground sensor and generates updated network maps for each confirmed location according to one or more embodiments. Specifically, updated network maps may be generated using three base station anchors reading positions (i.e., only three spheres equations). As such, the localization framework for 3D triangulation may be set up for solving sphere equations mathematically to find exact coordinates of a specific underground sensor.

Figure 4:
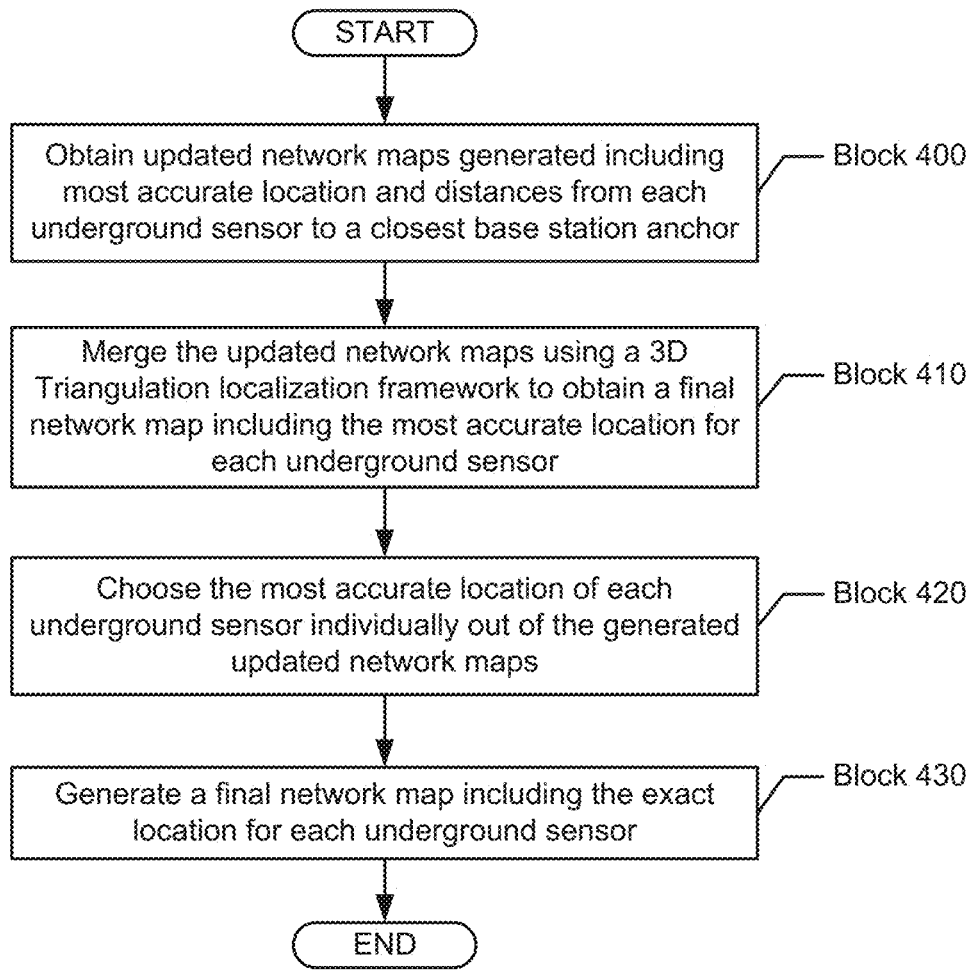
FIG. 4 shows a flowchart in accordance with one or more embodiments.

Turning to FIG. 4, FIG. 4 shows a flowchart in accordance with one or more embodiments. Specifically, FIG. 4 describes a method for localizing each underground sensor individually using the highest RMFS values for any given underground sensor. For example, the reservoir simulator may execute a multi-maps merging algorithm to generate a final network map including an exact location for each underground sensor.

In Block 400, the reservoir simulator obtains the updated network maps generated including most accurate location and distances from each underground sensor to a closest base station anchor according to one or more embodiments. Specifically, after having a number of updated network maps generated (i.e., 10 maps for example), the reservoir simulator may be able to identify what is the best map (i.e., between all of the 10 maps) for each sensor individually. For example, the control system may identify a parameter that evaluates distances derived from the RMFS measurement values, and identifies that the smaller the distance is from an underground sensor to a base station anchor, the more accurate the location of the underground sensor. As such, when the RMFS measurement value is smaller, the distance is predicted with a lower accuracy.

In Block 410, the updated network maps are merged by 3D Triangulation localization framework to obtain a final network map including the most accurate locations for each underground sensor. Specifically, the control system merges the maps by localizing every underground sensor individually using the highest three RMFS measurement values received per underground sensor (e.g., using the closest three base station anchor locations to the point of interest).

In Block 420, the most accurate location of each underground sensor is chosen individually out of the generated updated network maps.

In Block 430, a reservoir model is generated including a final map version which is a mixture of all the initial original maps mixed based on the individual senor location accuracy of each map. Specifically, the control system may identify underground sensors with a most accurate location to be inner well localized underground sensors (e.g., inner localized underground sensors). Identifying these underground sensors may allow for future iterations of the merging maps to provide a real-time and more accurate position of the underground sensors in subsequent versions of the updated network maps.

Figure 5:
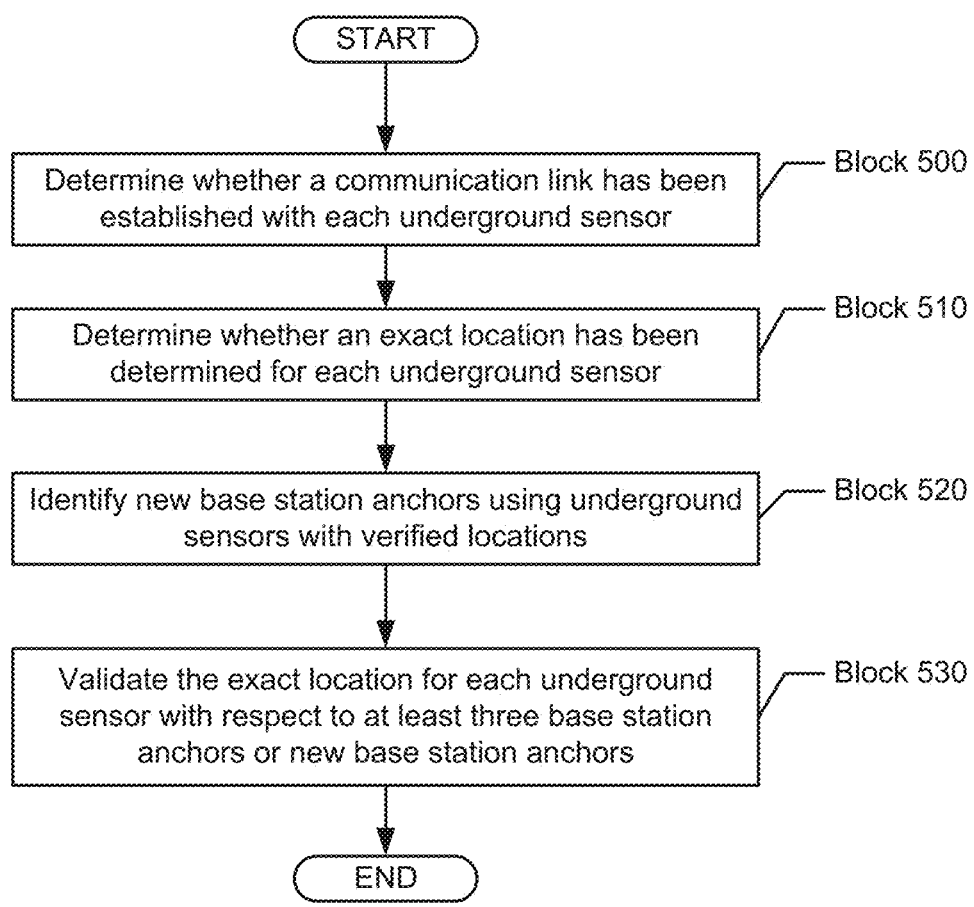
FIG. 5 shows a flowchart in accordance with one or more embodiments.

Turning to FIG. 5, FIG. 5 shows a flowchart in accordance with one or more embodiments. Specifically, FIG. 5 describes a method for using well localized neighboring underground sensors as new base station anchors. For example, a reservoir simulator may execute an inner base station anchor algorithm by verifying the approximated distances and locations associated with each underground sensor and subsequently verifying new distances and locations by using verified underground sensors as new base station anchors.

In Block 500, the reservoir simulator determines whether a communication link has been established with each underground sensor according to one or more embodiments.

In Block 510, the reservoir simulator determines whether an exact location has been determined for each underground sensor in accordance to one or more embodiments.

In Block 520, the reservoir simulator identifies new base station anchors using underground sensors with verified locations in accordance to one or more embodiments. Specifically, as underground sensors are identified as inner localized underground sensors, these underground sensors may be further identified as base station anchors. To this point, the closest 10 underground sensors to base station anchors (i.e., underground sensors with the most accurate locations) may be relabeled as new base station anchors to improve accuracy in subsequent iterations of the final network map.

In Block 530, the reservoir simulator validates the exact location for each underground sensor with respect to at least three base station anchors or new base station anchors in accordance to one or more embodiments. Specifically, to increase location accuracy and to maintain the same location accuracy over the whole underground sensors system, all underground sensors may have to be localized and identified as new base station anchors. To this point, using underground sensors as new base station anchors and starting from the underground sensors closest to the new base station anchors (e.g., the best location accuracy underground sensors) and moving to the furthest, may allow the reservoir simulator to maintain accuracy from the closest underground sensors to the furthest underground sensors (i.e., providing the whole underground sensors system with a constant high tracking accuracy).

Further, at least three conditions may be met in order to use underground sensors as new base station anchors in further updated network maps. These conditions may be: i) that a communication link to be established between the underground sensor that needs to be re-localized and the underground sensor used as a new base station anchor; ii) that the underground sensor used as a new base station anchor is closer to an existing base station anchor; and that if the underground sensors used as a new base station anchor is not one of the closest underground sensors to an existing base station anchor (i.e., closest 5 underground sensors), then the underground sensor itself must be first re-localized such that it gains a closer underground sensor location before being used as a new base station anchor.

Figure 6:
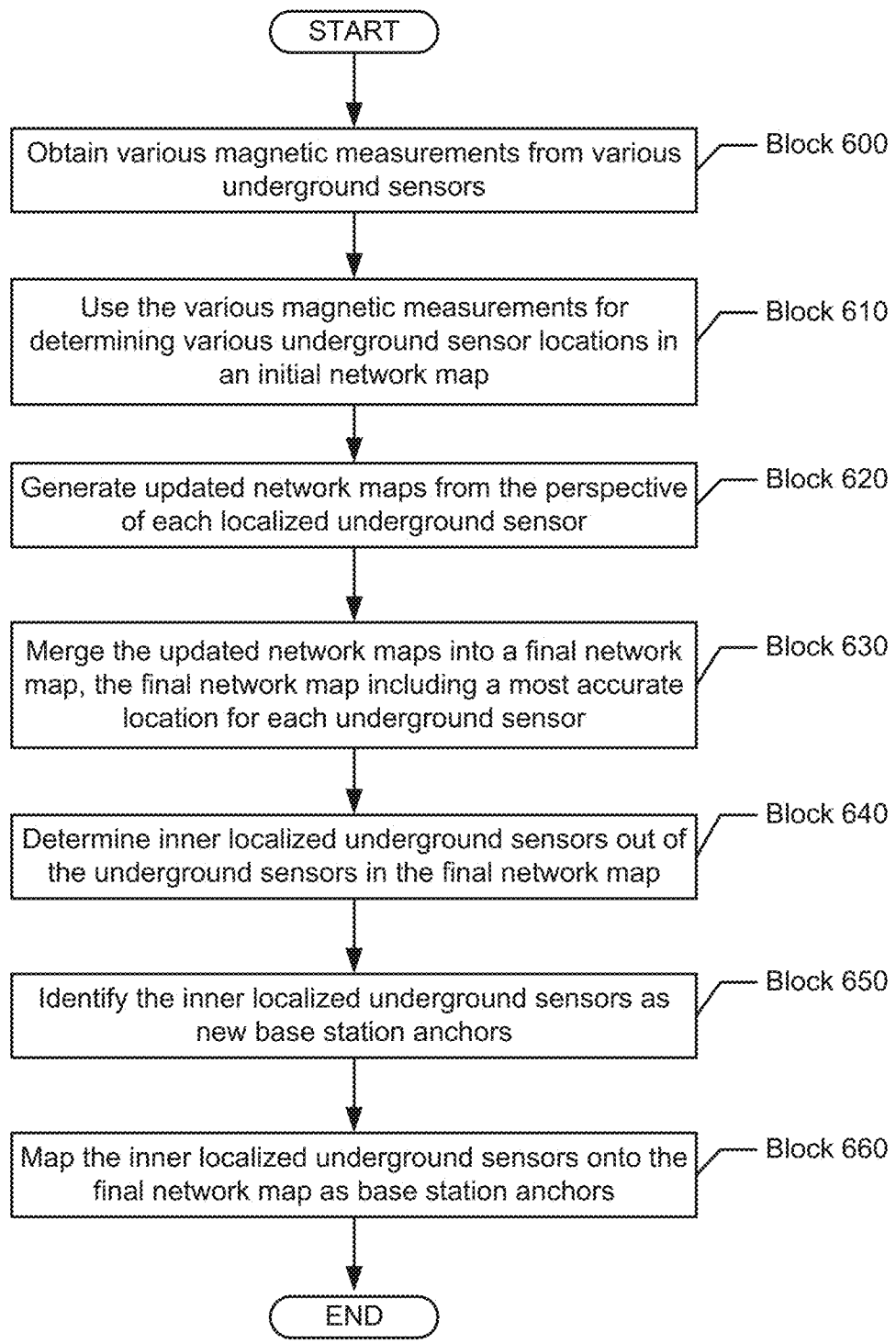
FIG. 6 shows a flowchart in accordance with one or more embodiments.

Turning to FIG. 6, FIG. 6 shows a flowchart in accordance with one or more embodiments. Specifically, FIG. 6 describes a method for mapping multiple underground sensors ("sensors") onto a network map. One or more blocks in FIG. 6 may be performed by one or more components as described above in FIG. 1 (e.g., reservoir simulator (140)). While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 600, various magnetic measurements are obtained from various sensors in accordance to one or more embodiments. Specifically, the magnetic measurements may be Received Magnetic Field Strength (RMFS) measurements obtained from each sensor. The sensors may be configured to communicate wirelessly to one another and to other wireless devices. As such, the sensors may be arranged in such a way that a receptor or receiver may obtain an identifier parameter from each RMFS measurement and immediately distinguish one RMFS measurement from another.

In Block 610, the various magnetic measurements are used for determining various sensor location in an initial network map in accordance to one or more embodiments. The initial network map may be provided in an original set up of a mapping process or the initial network map may be a previously generated updated or final network map that is being updated continuously. Further, magnetic measurements may be correlated to a specific sensor out of the various sensors and the sensor location may be estimated based on the magnetic measurement.

In Block 620, updated network maps are generated from the perspective of at least three different base station anchor in accordance to one or more embodiments. The magnetic measurements are grouped together and a point of reference may be identified with respect to a point of interest to triangulate the point of interest. As such, estimated locations may be found for at least four points and equations for each point may be developed in relation to the point of interest. For example, four equations may be developed in which three parameters are unknown. These parameters may be the 3D coordinates of the point of interest.

In Block 630, the updated network maps generated in Block 620 are merged into a final network map in accordance to one or more embodiments. The final network map may comprise a most accurate location for each sensor. Specifically, triangulation is performed with respect to each sensor starting from the most accurate sensor locations. These more accurate sensor locations may be a location of a sensor that has been verified in the map. As such, a most accurate location may be identified for all existing sensors and a map centered at this most accurate location may be generated for each sensor (also referred herein as "updated network maps"). Once updated network maps are generated for each most accurate location per sensor, the maps may be merged according to a rule in order to obtain an updated network map included all of the most accurate locations.

In Block 640, inner localized sensors are determined out of the various sensors in the final network map in accordance to one or more embodiments. Specifically, the most accurate locations may be evaluated with respect to one or more parameters. One of the parameters may be a condition for identifying that a sensor location is a location that has been verified with respect to at least one base station anchor. A verified sensor location may be an inner localized sensor.

In Block 650, inner localized sensors are identified as base station anchor in accordance to one or more embodiments. Based on their location with respect to base station anchors, sensors may have been identified up to this point as inner localized sensors. Further, inner localized sensors may be identified as base station anchors. For example, in a case in which the initial map started with 10 base station anchors and up to this point 5 inner localized sensors have been determined, after this block, a new iteration of the updated network map with be evaluated assuming there are 15 base station anchors in the map. This progression may allow for moving sensors to be tracked at all times once their location is verified once.

In Block 660, the sensors are mapped onto the final network map as base station anchors in accordance to one or more embodiments. Specifically, a final network map includes all of the positions of the sensors now as base station anchors. This final network map may allow for all base station anchors to be tracked in real time at all times.

Figure 7:
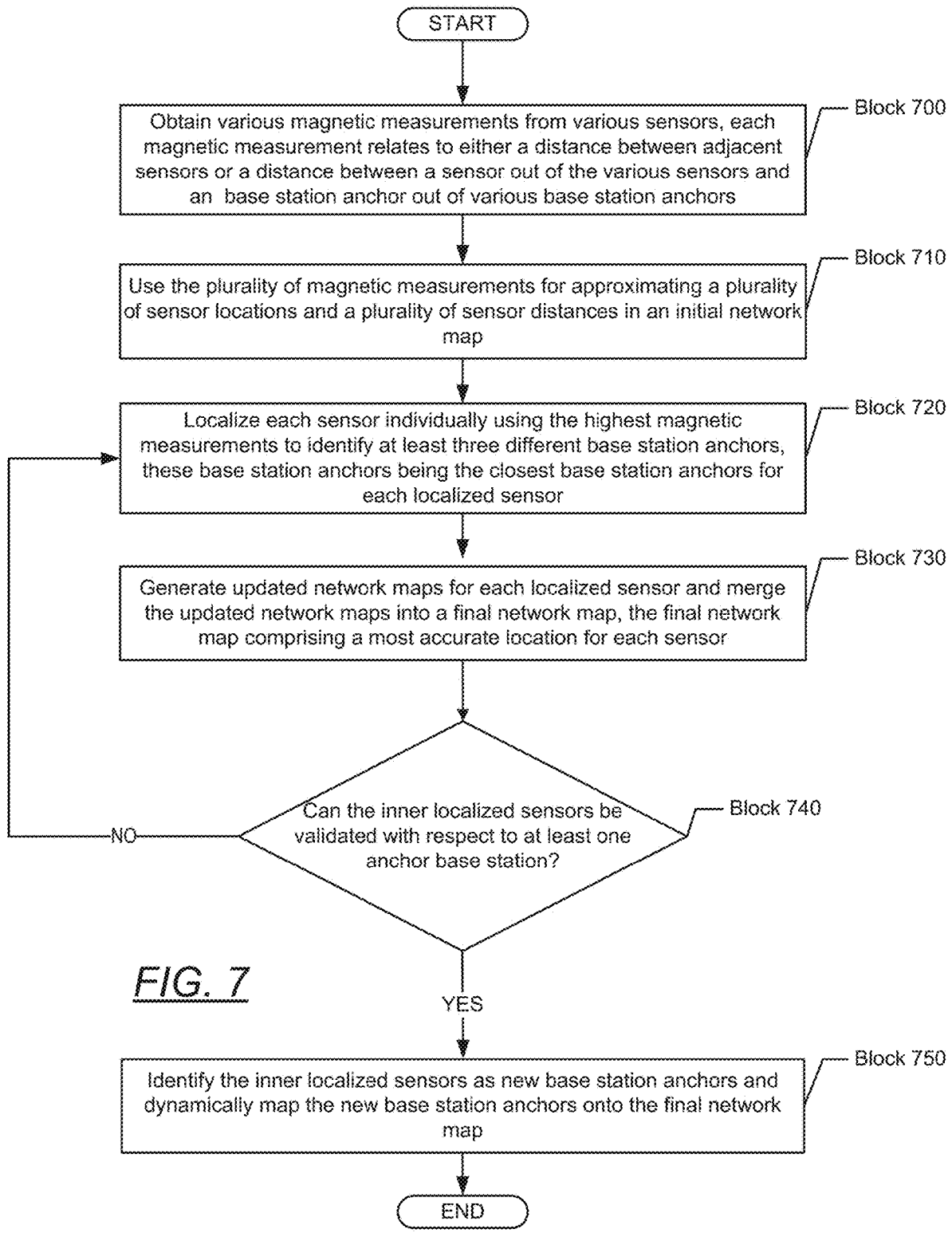
FIG. 7 shows a flowchart in accordance with one or more embodiments.

Turning to FIG. 7, FIG. 7 shows a flowchart in accordance with one or more embodiments. Specifically, FIG. 7 describes a method for mapping multiple sensors onto a network map. One or more blocks in FIG. 7 may be performed by one or more components as described above in FIG. 1 (e.g., reservoir simulator (140)). While the various blocks in FIG. 7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 700, various magnetic measurements are obtained from various sensors in accordance to one or more embodiments. Each of the magnetic measurements may relate to either a distance between adjacent sensors or a distance between a sensor out of the various sensors and a base station anchor out of various base station anchors. Specifically, a MI-based 3D localization system may acquire Received Magnetic Field Strength (RMFS) measurements via established channel models for triggering a distance estimation scheme.

In Block 710, the magnetic measurements are used for determining sensor locations in an initial network map in accordance to one or more embodiments. Specifically, a distance and a distance error are estimated using a control system via a Weighted Maximum Likelihood Estimation (WMLE) scheme. Further, location values may be obtained for each sensor as identifying the sensor locations may be reformulated into a convex relaxation approach using a Semidefinite Programming (SDP) relaxation. As a result, distances between every sensor and both the neighboring sensors as well as every base station anchor may be determined.

In Block 720, updated network maps are generated from the perspective of at least three different base station anchors in accordance to one or more embodiments. Specifically, a localization framework may be formed based on at least four second order equations (e.g., four spheres equations based on at least a point of interest and three different base station anchor locations) with three unknowns being the X, Y, and Z coordinates of the point of interest. As such, once this process is repeated for each sensor, an updated map may be generated using the distances estimated in Block 710. Further, the initial network map from the 3D triangulation method may be updated with the approximate coordinates of each sensor. This results in an updated network map each time a new location is found for each sensor. As such, after the control system acquires a rough idea of where the sensors are located, the localization framework may be reduced to be recognized as three second order equations (i.e., the three spheres equations) to generate map from every possible combination of three base station anchors reading positions.

In Block 730, the updated network maps generated are merged into a final network map and inner localized sensors are determined out of the sensors in the final network map in accordance to one or more embodiments. Specifically, the final network map may include a most accurate location for each sensor. As such, the reservoir simulator may merge the updated network maps generated in Block 720 may be based on the most accurate location for each sensor between all generated maps accordingly.

In Block 740, the control system evaluates whether the inner localized sensors are validated with respect to at least one base station anchor in accordance to one or more embodiments. Specifically, the accurate inner localized sensors may be reused as base station anchors to further increase the accuracy of the localization system in future updates of the network map.

In Block 750, if the localized sensors are validated in Block 740, the inner localized sensors are identified as new base station anchors and the sensors are dynamically mapped onto the final network map as new base station anchor in accordance to one or more embodiments. Specifically, effective localization of a sensor in the previous blocks may support accurately and timely locating and validating the locations of randomly-deployed sensors in underground environments such an oil reservoir fracture.

Further, obtaining an accurate location of the sensors inside the fracture may enable mapping the fracture, which reduces spending costs on fracturing information since the sensors may be injected in the oil reservoir after performing a first fracturing stage. To this point, the sensors may be miniature sensors traveling as fast as a fluid may carry them in the fractures. That is, the sensors may be distributed in the fracture and the sensors may start communicating among each other and exchanging information, including parameters indicative of their locations, to the wellbore coupled to the control system and the reservoir simulator. Based on this data, a map of the hydraulic fractures is generated. As such, based on these maps, engineers and technicians may be able to assess a fracture job independent of sufficient signal propagation.

In Block 720, if the localized sensors are not validated in Block 740, updated network maps are kept being generated from the perspective of at least another three different base station anchors in accordance to one or more embodiments. Specifically, using well-localized sensors as new base station anchors neutralizes and stabilizes the accuracy of the whole system, such that every sensor in the system achieves a same high level of location accuracy. In some embodiments, some sensors have more than three neighboring sensors that are closer to the base station anchors. As such, these sensors may have more than three sensors that could be used as inner anchors to re-localize them. In this case, the maximum number of maps are generated and merged from those inner base station anchors in a same merging algorithm. For example, when a sensor established a communication link with five neighboring sensors that are closer to a base station anchor and are already re-localized to their most optimum locations, at least 10 maps may be generated. In this case, the equation followed to identify the maps to be generated may be equal to $$\left(\frac{5!}{(5-3)!\,3!}\right) = \left(\frac{5!}{2!\,3!}\right) = 10.$$

The method described above does not rely in EM-based communication links. Specifically, the method provides locations in 3D underground within an oil reservoir. Further, the aforementioned method provides a reservoir simulation with input for mapping updated network maps based on an identified current location of a sensor. As such, the method does not require the sensors to assume an initial position nor the method is restricted by the range limitations of EM-based communication links.

Figure 8:
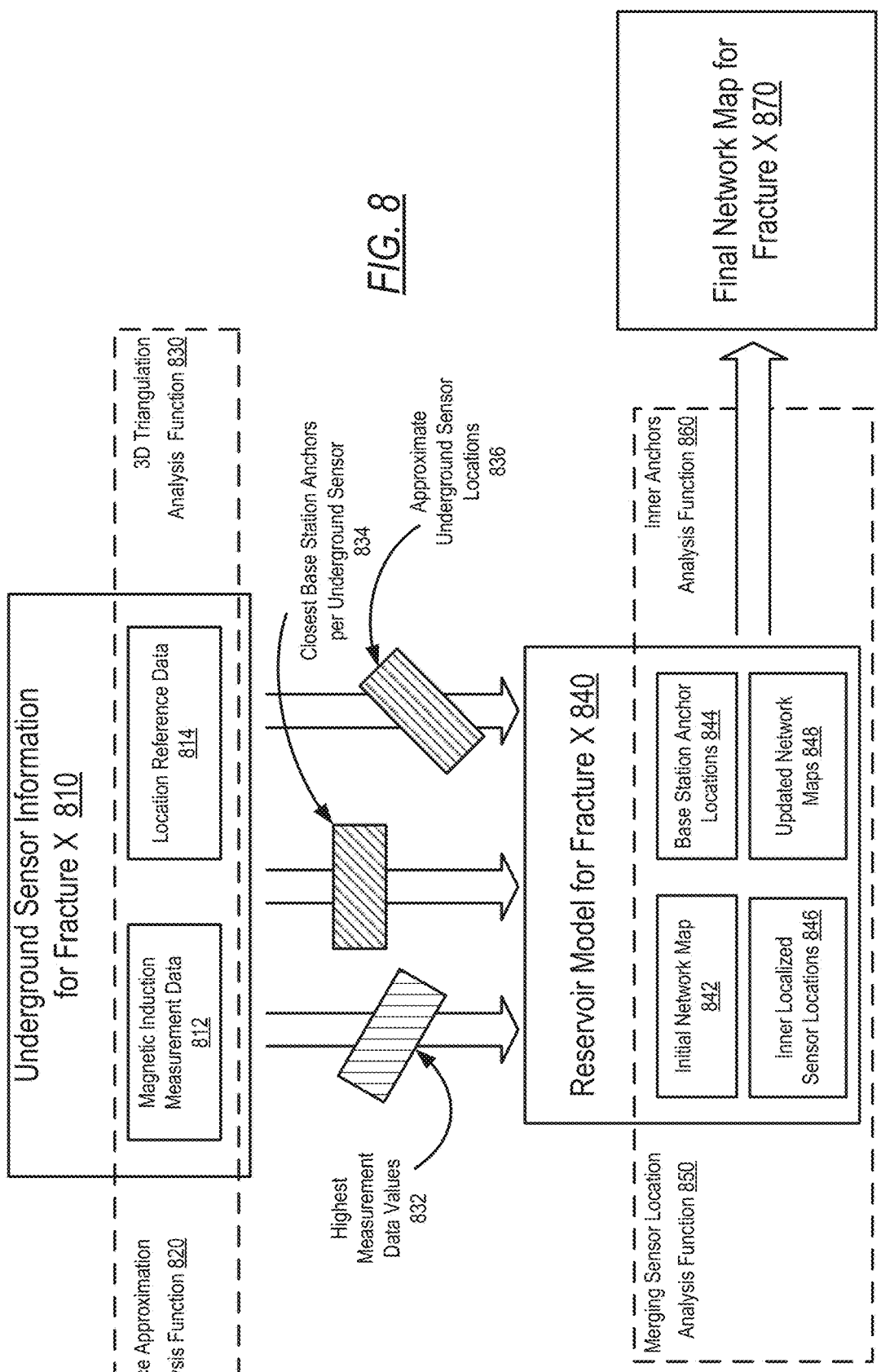
FIG. 8 shows an example in accordance with one or more embodiments.

Turning to FIG. 8, FIG. 8 provides an example of mapping various underground sensors to a final network map of a fracture in an oil reservoir. The following example is for explanatory purposes only and not intended to limit the scope of the disclosed technology. The example in FIG. 8 shows a schematic of implementing a mapping technique in a WUSN by using at least four different and distinct analysis functions to evaluate data obtained from underground sensors and base station anchors in the fracture.

In one or more embodiments, underground sensors may exchange wireless transmission among each other and with various base station anchors. The base station anchors a may be disposed in known locations. As such, it may be possible to determine a location of the underground sensors based on their signal strengths upon transmission exchanges. Specifically, underground sensor information f (e.g., underground sensor information for fracture X) may be obtained from various underground sensors in a fracture. The information may include magnetic induction measurement data (812) and location reference data (814). The magnetic induction measurement data (812) may be various RMFS measurement results. The location reference data (814) may be exact location information relating to various base station anchors.

In some embodiments, the magnetic induction measurement data (812) and location reference data (814) may be processed by a distance approximation analysis function (820) that identifies the highest RMFS measurement values to determine underground sensors in closest proximity to one or more base station anchors. The distance approximation analysis function (820) may approximate the distances among underground sensors and between the underground sensors and the base station anchors.

Further, in some embodiments, the magnetic induction measurement data (812) and location reference data (814) may be processed by a 3D triangulation analysis function (830) that identifies the highest RMFS measurement values to determine underground sensors in closest proximity to one or more base station anchors. The 3D triangulation analysis function (830) may estimate the locations of underground sensors in an initial network map.

In one or more embodiments, the aforementioned analysis functions may output identified highest measurement data values (832), closest base station anchors per underground sensor (834), and approximate underground sensor locations (836). Specifically, a reservoir model (e.g., reservoir model for fracture X (840)) may receive these outputs as inputs for modeling. In some embodiments, modeling includes mapping the underground sensors and the base station anchors. As such, the reservoir model may include an initial network map (842), base station anchor locations (844), inner localized sensor locations (846), and updated network maps (848).

The initial network map (842) may be an updated map, or a final map that may be updated. Specifically, the initial network map (842) may be used for allocating an estimated location of the underground sensors. The base station anchor locations (844) may be reference locations (e.g., static devices that do not move) in the fracture.

In one or more embodiments, the highest measurement data values (832), the closest base station anchors per underground sensor (834), and the approximate underground sensor locations (836) may be processed by a merging sensor location analysis function (850) such that updated network maps (848) are generated for each underground sensor. The updated network maps (848) generated may be merged with each other by solving various second order spherical equations provided by the location of the closest base station anchors. Specifically, the locations of the closest base station anchors may be converted in mathematical equations as a function of a signal range to a point of interest inside the fracture. The point of interest being an estimated underground sensor location.

In one or more embodiments, the inputs received by the reservoir model may be further processed by an inner anchors analysis function (860) to identify inner localized sensor locations (846) that may be mapped as new base station anchors in subsequent updated network maps. These mapped new base station anchors may reduce computational time of the reservoir model as new base station anchors are interpreted by the reservoir model to have verified locations fixed in the network map.

Finally, after the underground sensor information has been fully processed by the four analysis functions, an exact location for each sensor may be mapped in real time within the fracture (e.g., final network map for fracture X).

While FIG. 8 shows a configuration of components, other configurations may be used without departing from the scope of the disclosure. For example, various components in FIG. 8 may be combined to create a single component. As another example, the functionality performed by a single component may be performed by two or more components.

Figure 9:
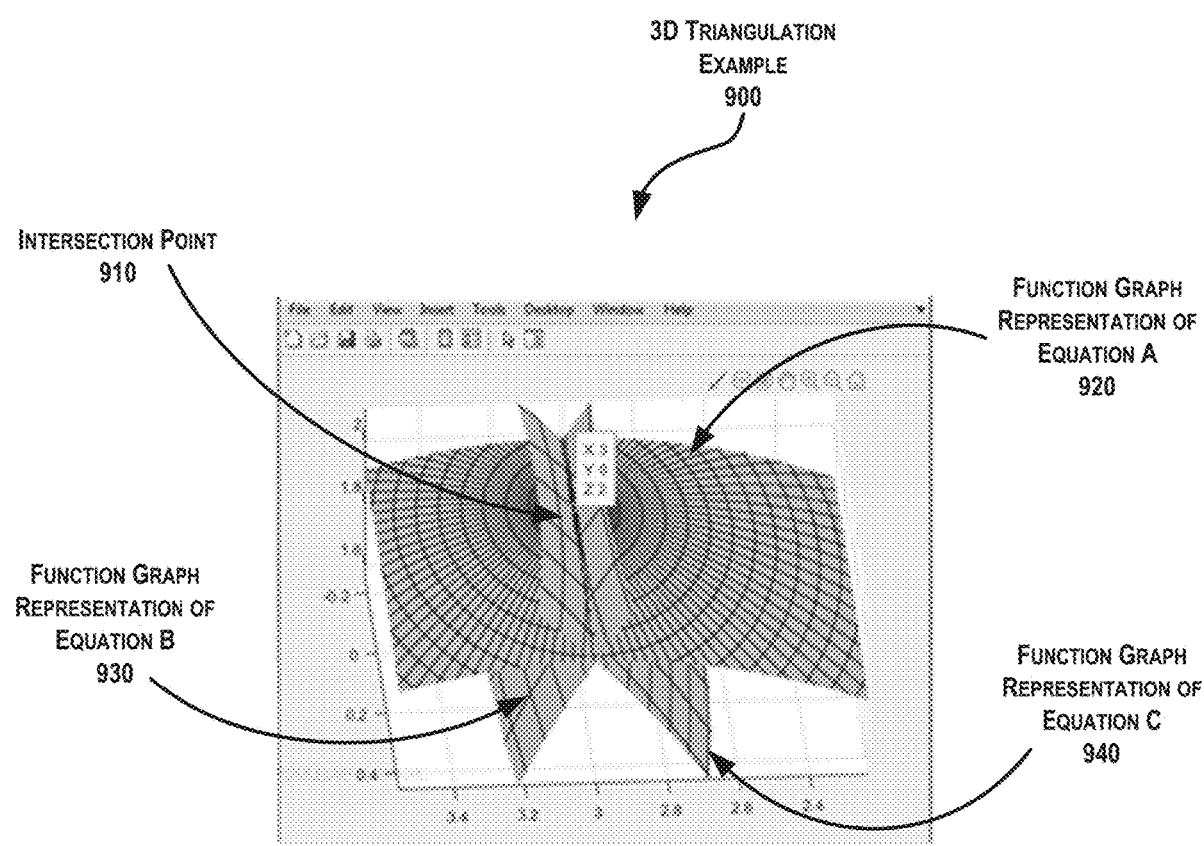
FIG. 9 shows an example in accordance with one or more embodiments.
Figure 10A:
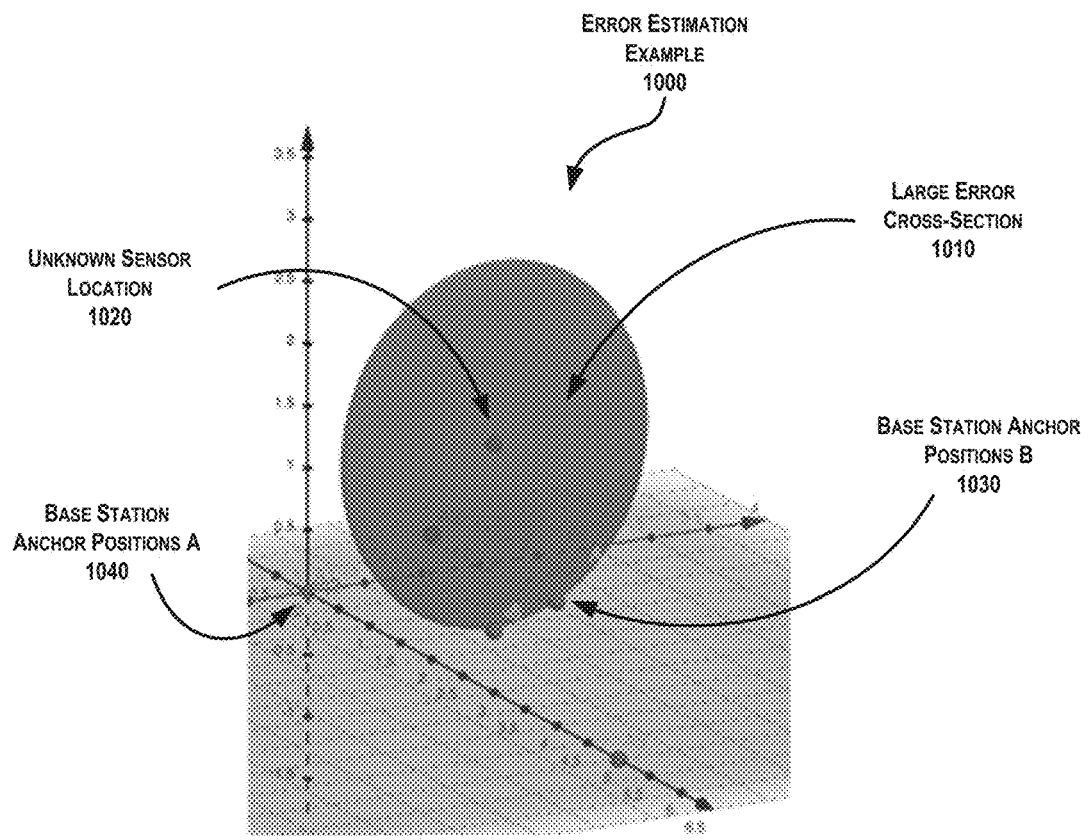
FIGS. 10A and 10B show an example in accordance with one or more embodiments.
Figure 10B:
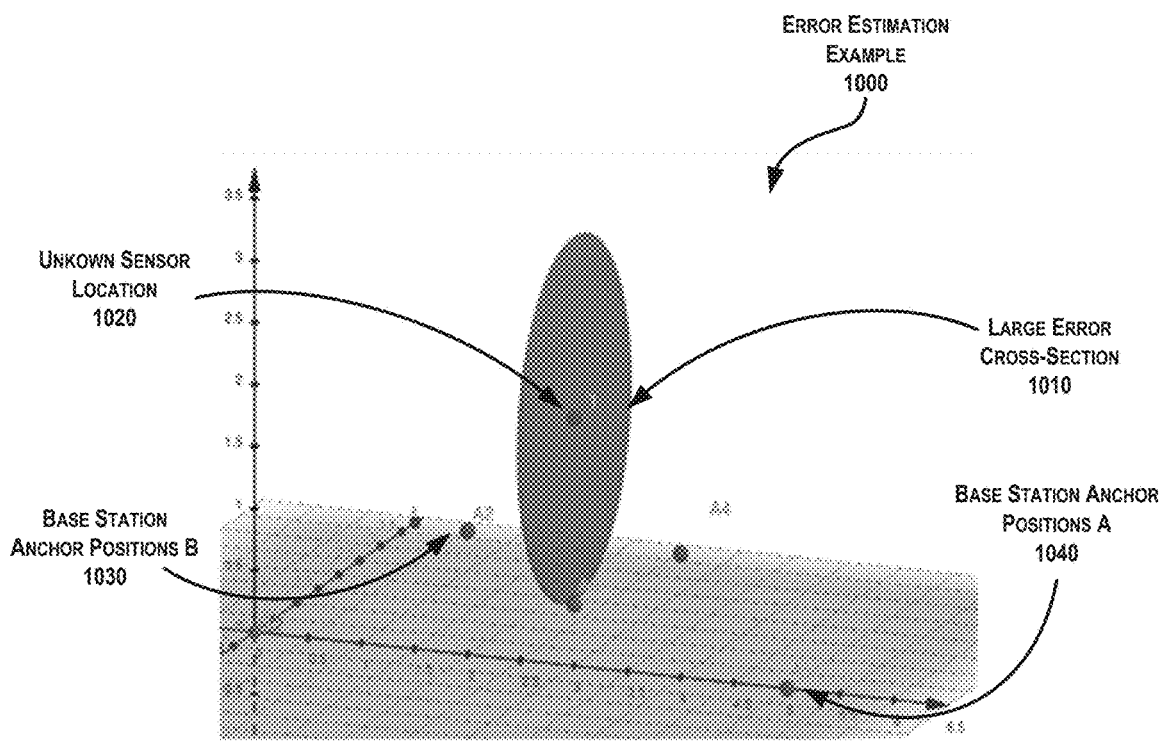
Figure 11A:
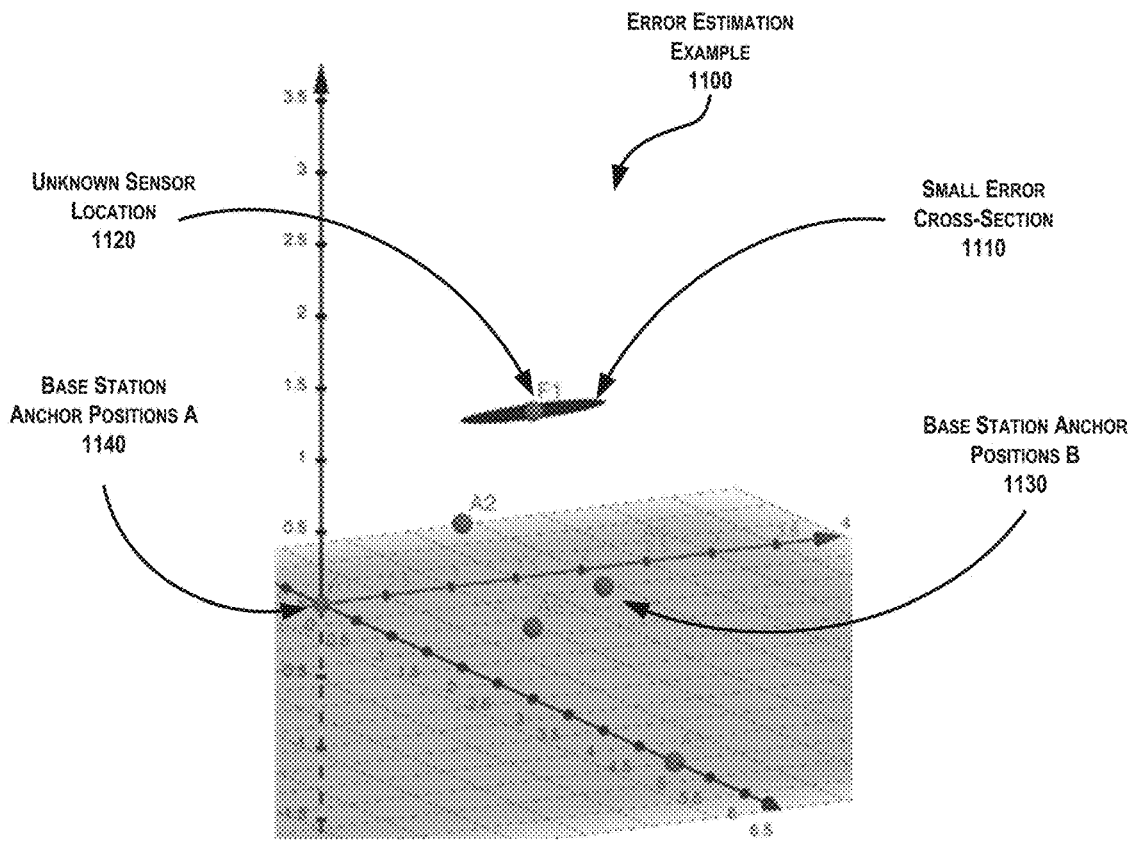
FIGS. 11A and 11B show an example in accordance with one or more embodiments.
Figure 11B:
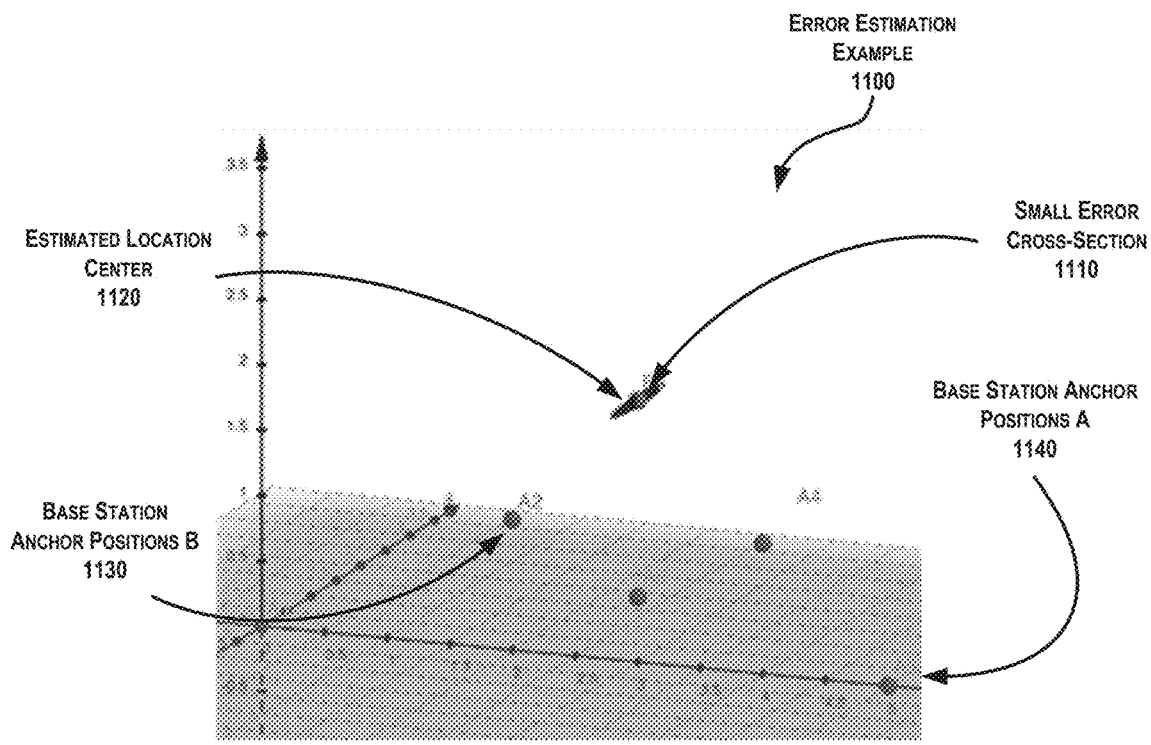

Turning to FIG. 9, FIG. 9 illustrates a graphical representation of a 3D triangulation process in accordance to one or more embodiments. Specifically, a MATLAB model example shows that the 3D triangulation (900) localizes a sensor in an unknown location using four known base station anchor positions with the exact distance from every base station anchor position to the needed sensor being mapped in a sphere equation.

In the example, an unknown sensor is located at an intersection point (910) (3, 0, 2) in the XYZ coordinate system. In this case, a set of four base station anchors in the following locations may be centered at (0, 0, 0), (1, 0, 1), (2, 1, 1), and (3, 0, 0), so the distance from the base station anchor positions to the sensor is $\sqrt{13}$ m, $\sqrt{5}$ m, $\sqrt{3}$ m, and 2 m respectively. At this point, function graphs may be derived and mapped (e.g., function graph representation of equation A (920), function graph representation of equation B (730), and function graph representation of equation C (740)) from at least three known base station anchor positions. The different base station anchor positions and the distances from the base station anchor locations to the sensor in MATLAB may be derives as a result to obtain the coordinates of the point of interest (e.g., intersection point (910) at the right exact location of the sensor).

Similarly, another example (not represented in graphs in the figures) is a slight modification for a case in which an initial network map is to be generated and a point of interest is a location of a sensor at (10, 3, 7) in the XYZ coordinates and four known base station anchor positions at (9, 0, 0), (10, 0, 0), (11, 0, 1), and (11, 1, 1), so the distance from the base station anchor positions to the sensor is $\sqrt{59}$ m, $\sqrt{58}$ m, $\sqrt{46}$ m, and $\sqrt{41}$ m respectively.

Assuming that finding the location of the sensor is needed given the positions of the four base station anchors and the distances from the sensor, at least the following four sphere equations are used: (i) $(x-9)^2+y^2+z^2=59$, (ii) $(x-10)^2+y^2+z^2=58$, (iii) $(x-11)^2+y^2+(z-1)^2=46$, and (iv) $(x-11)^2+(y-1)+(z-1)^2=41$.

Solving (i) with (ii), $x^2-18x+81-59=x^2-20x+100-58$ is obtained, which simplifies to x=10.

Solving (iii) with (iv), $y^2-46=(y-1)^2-41$ is obtained, which simplifies to y=3.

Solving (ii) with (iii) and x=10, $z^2-58=z^2-2z+1-46+1$ is obtained, which simplifies to z=7.

Therefore, the sensor must be at location (10, 3, 7) in the XYZ coordinate.

Turning to FIGS. 10A-11B, FIGS. 10A-11B provide an example of an error approximation generated based on localization for 10% of a total number of all base station anchors in accordance to one or more embodiments. The following example is for explanatory purposes and not intended to limit the scope of the disclosed technology. Specifically, FIGS. 10A-11B illustrate the importance of the multi-maps merging scheme by showing that the distance between a sensor and the positions of the base station anchor that is used to localize that sensor affects the localization accuracy of the sensor. In the error estimation (1000, 1100), using 10% as the error in the approximated distances between the sensor to all base station anchor positions configures the error in a location may be anywhere in the circular areas in FIGS. 10A-11B (e.g., large error cross-section (1010) for unknown sensor location (1020) and small error cross-section (1110) for an unknown sensor location (1120)).

In particular, using A1, A5, and A6 base station anchor positions (e.g., base station anchor positions A (1040) and base station anchor positions A (1140)) to localize F1 (e.g., unknown sensor location (1020) and unknown sensor location (1020)), possess an error of ±9.5 cm in the X-axis, ±135 cm in the Y-axis, and ±147.25 cm in the Z-axis. However, using A2, A4, and A6 (e.g., base station anchor positions B (1030) and base station anchor positions B (1030)) base station anchor positions to localize F1 increase the accuracy dramatically, where using those positions result in an error of ±56 cm in the Y-axis, ±5 cm in the Z-axis, and no error at all in the X-axis (i.e., keeping in mind that F1 is located in the XYZ coordinate system exactly at (300, 0, 200)). As such, the multi-maps merging scheme prevents error when it comes to using far base station anchor positions. Specifically, while the error in the distance approximation will be higher in far base station anchor positions, the proximity of each base station anchor is evaluated with respect to the unknown location of the sensor to obtain a most accurate sensor location independent from the mappings generated based on farther base station anchors.

In addition, the method may be implemented in any application where underground environment mapping is required. These implementations may be in oil and gas exploration, intelligent agriculture, pipeline fault diagnosis, mine disaster rescue, underground tracking of a surface area, underground city infrastructure monitoring, and underwater tracking applications among others.

Figure 12A:
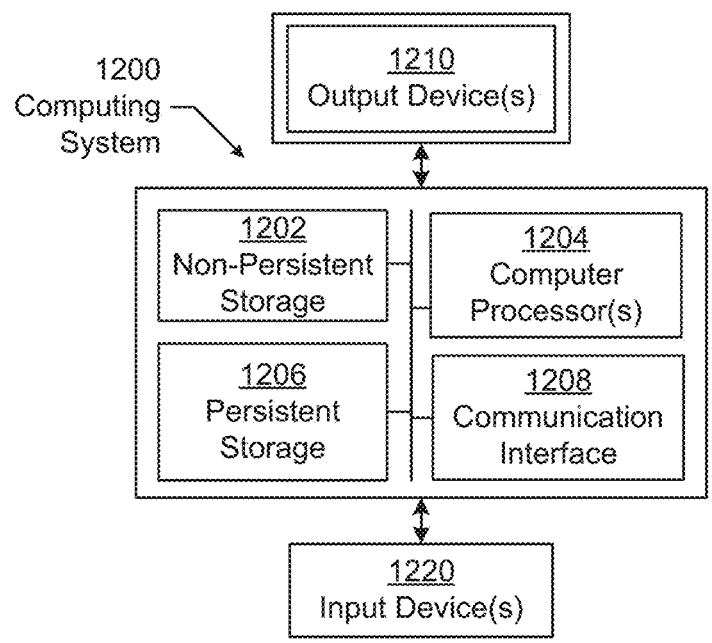
FIGS. 12A and 12B show an example in accordance with one or more embodiments.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 12A, the computing system (1200) may include one or more computer processor(s) (1204), non-persistent storage (1202) (e.g., random access memory (RAM), cache memory, flash memory, etc.), one or more persistent storage (1206) (e.g., a hard disk, an optical drive such as a compact disk (CD) drive or digital versatile disk (DVD) drive, a flash memory stick, etc.), and numerous other elements and functionalities. The computer processor(s) (1204) may be an integrated circuit for processing instructions. For example, the computer processor(s) (1204) may be one or more cores, or micro-cores of a processor. The computing system (1200) may also include one or more input device(s) (1220), such as a touchscreen, keyboard, mouse, microphone, touchpad, electronic pen, or any other type of input device. Further, the computing system (800) may include one or more output device(s) (1210), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1200) may be connected to a network system (1230) (e.g., a local area network (LAN), a wide area network (WAN) such as the Internet, mobile network, or any other type of network) via a network interface connection (not shown). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (1200) may be located at a remote location and be connected to the other elements over a network system (1230). Further, one or more embodiments of the invention may be implemented on a distributed system having various nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 12B:
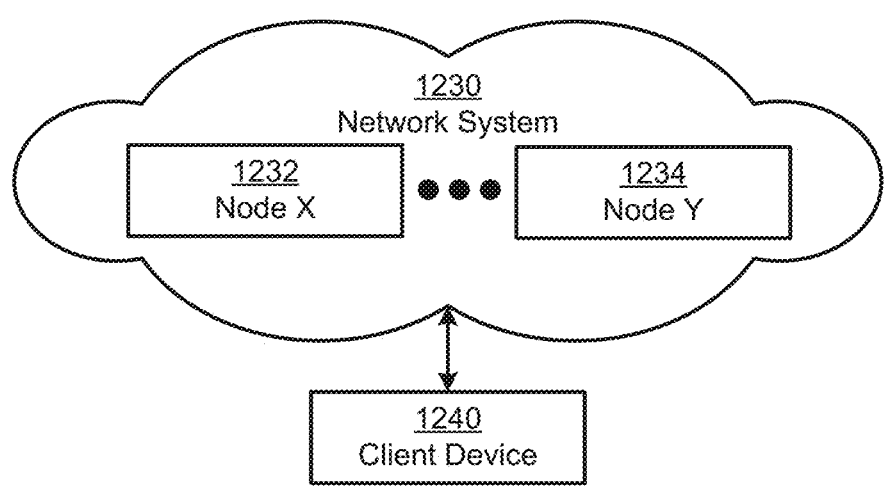

The computing system (1200) in FIG. 12A may be connected to or be a part of a network. For example, as shown in FIG. 12B, the network system (1230) may include multiple nodes (e.g., node X (1222), node Y (1224)). Each node may correspond to a computing system, such as the computing system shown in FIG. 12A, or a group of nodes combined may correspond to the computing system shown in FIG. 12A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (1200) may be located at a remote location and connected to the other elements over a network.

Although not shown in FIG. 12B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1232), node Y (1234)) in the network system (1230) may be configured to provide services for a client device (1240). For example, the nodes may be part of a cloud computing system. The nodes may include functionality to receive requests from the client device (1240) and transmit responses to the client device (1240). The client device (1240) may be a computing system, such as the computing system shown in FIG. 12A. Further, the client device (1240) may include and/or perform all or a portion of one or more embodiments of the disclosure.

The computing system or group of computing systems described in FIGS. 12A and 12B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (1200) in FIG. 12A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections).

Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 12A, while performing one or more embodiments of the disclosure, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A−B), and the status flags may be read to determine if the result is positive (i.e., if $A>B$, then A−B>0). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 12A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 12A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 12A and the nodes and/or client device in FIG. 12B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
obtaining a plurality of magnetic measurements from a plurality of sensors and a plurality of anchors, wherein a spatial location of all of the sensors in the plurality of sensors is initially unknown;
using the plurality of magnetic measurements to determine a plurality of sensor-to-sensor distance estimates and a plurality of sensor-to-anchor distance estimates;
generating a plurality of network maps using a plurality of anchor combinations and the plurality of sensor-to-anchor distance estimates, wherein a network map comprises estimates for the spatial locations of each sensor in the plurality of sensors;
merging the network maps into a final network map, the final network map comprising a most accurate estimated spatial location for every sensor in the plurality of sensors;
updating the final network map by recursively:
determining inner localized sensors out of the plurality of sensors in the final network map;
identifying the inner localized sensors as new anchors; and
mapping the inner localized sensors onto the final network map as anchors.

2. The method of claim 1,
wherein the inner localized sensors are sensors with an accurate location from at least one previously identified anchor.

3. The method of claim 1, further comprising:
obtaining an initial network map,
wherein the initial network map comprises a theoretical spatial location for each sensor in the plurality of sensors and a spatial location of all anchors in the plurality of anchors,
wherein the theoretical spatial location of each sensor in the plurality of sensors is determined by using a 3D triangulation scheme and a plurality of sphere equations,
wherein each sphere equation in the plurality of sphere equations references a different anchor.

4. The method of claim 1, further comprising:
determining the inner localized sensors by performing a 3D triangulation scheme and solving a plurality of sphere equations, each sphere equation in the plurality of sphere equations corresponding to a unique anchor.

5. The method of claim 1,
wherein the plurality of sensors comprises miniature sensors that move in between rock formations inside an oil reservoir.

6. The method of claim 1, further comprising:
dynamically updating the spatial location of all of the sensors in the plurality of sensors and tracking a displacement of any moving sensors out of the plurality of sensors.

7. The method of claim 6,
wherein tracking the displacement of any of the moving sensors comprises comparing the spatial location and updated spatial location of the moving sensor at any point in time.

8. A system, comprising:
a well control system coupled to a plurality of sensors and a plurality of anchors,
a reservoir simulator comprising a computer processor, wherein the reservoir simulator is coupled to the well control system and comprises functionality for:
obtaining, by the computer processor, a plurality of magnetic measurements from the plurality of sensors;
using the plurality of magnetic measurements to determine a plurality of sensor-to-sensor distance estimates and a plurality of sensor-to-anchor distance estimates;
generating a plurality of network maps using a plurality of anchor combinations and the plurality of sensor-to-anchor distance estimates, wherein a network map comprises estimates for spatial locations of each sensor in the plurality of sensors;

merging the network maps into a final network map, the final network map comprising a most accurate spatial location for each sensor in the plurality of sensors;

updating the final network map by recursively:
determining inner localized sensors out of the plurality of sensors in the final network map;
identifying the inner localized sensors as new anchors; and
mapping the inner localized sensors onto the final network map as anchors.

9. The system of claim 8, wherein the inner localized sensors are sensors with an accurate location from at least one previously identified anchor.

10. The system of claim 8, wherein the reservoir simulator further comprises functionality for:
obtaining, from a memory buffer, an initial network map,
wherein the initial network map comprises a theoretical sensor location for each sensor in the plurality of sensors and a spatial location of all anchors in the plurality of anchors,
wherein the theoretical spatial location of each sensor in the plurality of sensors is determined using a 3D triangulation scheme and a plurality of sphere equations,
wherein each sphere equation in the plurality of sphere equations references a unique anchor.

11. The system of claim 8, further comprising:
a well system,
wherein the well system transmits information to the well control system to map the plurality of sensors onto the final network map by dynamically updating the plurality of sensor locations, tracking a displacement of any moving sensors out of the plurality of sensors, and
wherein tracking the displacement of any of the moving sensors comprises comparing spatial location and updated spatial location at any point in time.

12. The system of claim 8, further comprising:
dynamically updating the spatial location of all the sensors in the plurality of sensors and tracking a displacement of any moving sensors out of the plurality of sensors.

13. The system of claim 12, wherein tracking the displacement of any of the moving sensors comprises comparing the displacement of the moving sensor at any point in time.

14. A non-transitory computer readable medium storing instructions executable by a computer processor, the instructions comprising functionality for:
obtaining a plurality of magnetic measurements from a plurality of sensors;
obtaining a spatial location for a plurality of anchors;
using the plurality of magnetic measurements to determine a plurality of sensor-to-sensor distance estimates and a plurality of sensor-to-anchor distance estimates;
generating a plurality of network maps using a plurality of anchor combinations and the plurality of sensor-to-anchor distance estimates, wherein a network map comprises estimates for spatial locations of each sensor in the plurality of sensors;

merging the plurality of network maps into a final network map, the final network map comprising a most accurate spatial location for each sensor in the plurality of sensors;

updating the final network map by recursively:
determining inner localized sensors out of the plurality of sensors in the final network map using the plurality of sensor-to-anchor distance estimates;
identifying the inner localized sensors as new anchors; and
mapping the inner localized sensors onto the final network map as anchors and accordingly altering some sensor-to-sensor distance estimates in the plurality of sensor-to-sensor distance estimates to sensor-to-anchor distance estimates.

15. The non-transitory computer readable medium of claim 14, wherein the inner localized sensors are sensors with an accurate location from at least one previously identified anchor.

16. The non-transitory computer readable medium of claim 14, the instructions further comprise functionality for:
obtaining an initial network map,
wherein the initial network map comprises a theoretical sensor location for each sensor in the plurality of sensors and the spatial location of all anchors in the plurality of anchors,
wherein the theoretical spatial location of each sensor in the plurality of sensors is determined using a 3D triangulation scheme and a plurality of sphere equations,
wherein each sphere equation in the plurality of sphere equations references a unique anchor.

17. The non-transitory computer readable medium of claim 14, the instructions further comprise functionality for:
determining the inner localized sensors by performing a 3D triangulation scheme and solving a plurality of sphere equations,
wherein each sphere equation in the plurality of sphere equations corresponds to a unique anchor.

18. The non-transitory computer readable medium of claim 14, wherein the plurality of sensors comprises miniature sensors that move in between narrow spaces of rock formations inside an oil reservoir.

19. The non-transitory computer readable medium of claim 14,
dynamically updating the spatial location of all of the sensors in the plurality of sensors and tracking a displacement of any moving sensors out of the plurality of sensors.

20. The non-transitory computer readable medium of claim 19,
wherein tracking the displacement of any of the moving sensors comprises comparing the displacement of the moving sensor at any point in time.

* * * * *